March 2, 1937. P. E. CATE 2,072,617
STOP MECHANISM FOR BELLOWS DEVICES
Filed Sept. 25, 1933
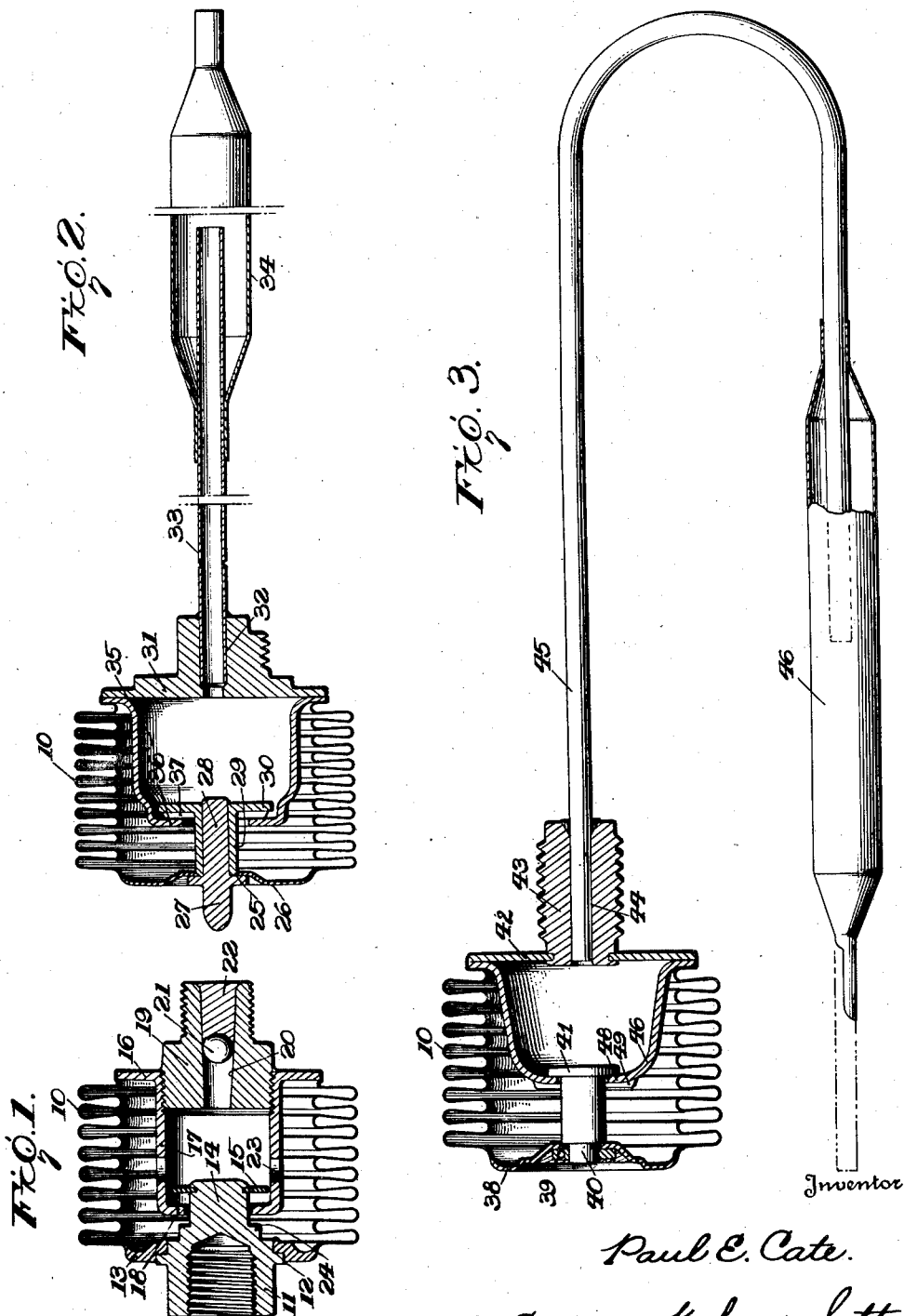
Inventor
Paul E. Cate.
By Cameron, Kerkam & Sutton
Attorneys Patented Mar. 2, 1937

2,072,617

UNITED STATES PATENT OFFICE 2,072,617

STOP MECHANISM FOR BELLOWS DEVICES

Paul E. Cate, Knoxville, Tenn., assignor to The Fulton Sylphon Company, Knoxville, Tenn., a corporation of Delaware Application September 25, 1933, Serial No. 690,965

2 Claims. (Cl. 297—8)

This invention relates to expansible and collapsible containers or vessels of the bellows type, and more particularly to means for limiting the expansive and contractive movements thereof.

It is an object of this invention to provide a bellows with interior means which limits both the expansive and contractive movements of the bellows.

Another object of this invention is to provide a device of the type characterized which is simple in construction, inexpensive to manufacture, easy to assemble, and efficient and certain in operation.

Other objects will appear as the description of the invention proceeds.

The invention is capable of receiving a variety of mechancal expressions, three of which are illustrated on the accompanying drawing, but it is to be expressly understood that the drawing is for purposes of illustration only and is not to be construed as a definition of the limits of the invention, reference being had to the appended claims for that purpose.

Referring in detail to the drawing, wherein the same reference characters are employed to designate corresponding parts in the several figures:—

Fig. 1 is an axial section of a bellows container or vessel provided with means embodying the present invention;

Fig. 2 is an axial section of a bellows type of motor vessel used in a bulb thermostat and showing another embodiment of the present invention; and Fig. 3 is a corresponding axial section of a third embodiment of the present invention.

In the form shown in Fig. 1 the bellows 10 may be of any suitable size, number of folds, material, etc., and applied to any appropriate use, whether thermostatic or otherwise. Suitably attached to one end thereof is an end member 11, here shown as having a flange 12 designed to be suitably secured, as by soldering or brazing, to the integral end wall 13 of the bellows, but said member 11 may be of any other suitable construction and attached to the end of the bellows in any other suitable way. Member 11 has an interiorly projecting post 14, to which is suitably secured, as by soldering, staking, etc., a plunger member 15. As here shown, the post 14 is grooved adjacent its end and the plunger member 15 takes the form of a disk or plate sprung or otherwise suitably introduced into and secured in said groove.

The opposite end of the bellows 10 has a closure member 16 of any suitable construction and attached to the end of the bellows in any suitable way. As here shown said closure member 16 has formed integrally therewith a cylindrical member 17 having at its inner end an inwardly-directed flange 18 provided with a central aperture of sufficient size to receive the post 14 without interference with relative movement between the post and flange, said flange, however, projecting inwardly to a sufficient amount so as to engage the plunger member 15 and constitute a stop for preventing further relative movement between the same in the direction corresponding to the expansion of the bellows. In this embodiment the outer end of the member 17 is interiorly threaded and a plug 19 is adapted to be threaded thereinto and suitably sealed thereto, as by soldering or brazing, so as to complete the chamber formed by the interior of the bellows. Plug 19 has an aperture 20 extending therethrough, so that a suitable charge of thermosensitive fluid may be introduced into the interior of the bellows 10, after which the aperture 20 may be sealed by a ball 21 and a plug of solder 22. If the interior of the bellows is to remain in open communication with some exterior container or source of fluid supply, the ball 21 and plug 22 will be omitted. In order to provide free access between the interior of the member 17 and the interior of the bellows 10 even when the flange 18 is in engagement with the plunger 15, the member 17 is provided with one or more holes 23 extending therethrough.

The radial flange 18 on the end wall or member 16 of the bellows chamber therefore cooperates with the plunger member 15 and a suitably positioned shoulder 24 or other surface on the member 11 or end wall of the bellows to constitute a limit stop for both the expansive and contractive movements of the bellows 10, flange 18 engaging the plunger 15 when the bellows has expanded to a predetermined degree, and flange 18 engaging the shoulder 24 or other surface on the member 11 when the bellows has contracted to a predetermined degree. At the same time the flange 18 surrounds the post 14 with sufficient clearance so that there is no interference to free expansive and contractive movements of the bellows 10 within the limits thus provided, but expansion or contraction thereof to an extent that might injure the bellows or produce an undesired extent of movement of the parts associated therewith is effectively prevented by the relatively rigid interior stop members.

In the embodiment shown in Fig. 1 the cylindrical member 17, which cooperates with the plunger 15 to provide the stop as heretofore explained, is shown as formed integrally with the end wall 16. The combined member may, for example, be formed as a die casting or as a stamping. In the embodiments of Figs. 2 and 3 the corresponding interior member may be formed of drawn sheet metal.

Referring to Fig. 2, the bellows 10 has an aperture 25 in its integral end wall 26 and a flanged plug 27 is suitably secured to said end wall 26, as by soldering or brazing, although it is to be expressly understood that any other suitable form of end wall and end member may be employed. Projecting inwardly from said plug 27 is a post 28 on which is suitably secured, as by soldering or staking, a sleeve 29 having an outwardly directed flange 30.

Suitably secured to the opposite end of the bellows 10, as by soldering or brazing, is an end member 31, here shown as having an aperture 32 extending therethrough and in which is suitably secured a pipe 33 leading to a thermostatic bulb 34. Also secured to said end member 31 and the bellows 10 is a cup-shaped member 35 having an inwardly directed flange 36 adapted to cooperate with the flange 30 and with the inner face of the end wall 26, which may be formed or pressed inwardly as shown, to limit the expansive and contractive movements of the bellows 10. The flange 36 has sufficient clearance with the sleeve 29 so that binding is prevented. In order to provide open communication between the interior of the member 35 and the interior of the bellows 10 when the flanges 30 and 36 are in cooperative engagement, flange 30 is shown as provided with a plurality of circumferentially spaced lugs or projections 37, which may be formed by stamping for example, so that when flange 36 engages said lugs or other suitable projections, adequate space is provided between the same for the flow of fluid between the chambers within members 35 and 10. If preferred, the projections 37 can be formed on the flange 36 rather than flange 30, or they can be formed on both.

In the form shown in Fig. 3 the bellows 10 has an integral end wall 38 within an aperture 39 in which is suitably secured a post 40 having an inwardly directed flange 41 which may be provided by the construction shown in either Fig. 1 or Fig. 2. The opposite end of the bellows 10 has an end member 42 to which is suitably attached a mounting thimble 43 having an aperture 44, in which is secured a tube 45 extending to a thermostatic bulb 46. Also suitably secured to the end of the bellows 10 and said closure member 42, as by soldering or brazing, is a cup-shaped sheet metal member 46 of a somewhat different form than that shown in Fig. 2. Communication between the interior of the bellows 10 and said member 46, to provide for free flow of fluid between these chambers, can be effected by the provisions disclosed in either Fig. 1 or Fig. 2. As in the latter embodiment the end of the member 46 is shaped to provide a radially directed flange 48 for cooperating with the flange 41 to provide a stop to limit relatively expansive movements of the bellows 10. In this embodiment the flange 48 is provided with outwardly directed lugs 49, which may be formed by stamping for example, for engagement with the end wall 38 so that at the desired limit of contraction of the bellows 10 free communication between the interior of bellows 10 and member 46 will not be prevented.

It will therefore be perceived that by the present invention a simple, inexpensive and effective means has been provided within the interior of a bellows for limiting the expansive and contractive movements thereof.

While the embodiments of the invention illustrated on the drawing have been described with considerable particularity, it is to be expressly understood that the invention is not restricted thereto, as the same is capable of receiving a variety of mechanical expressions, some of which will now suggest themselves to those skilled in the art. It is to be expressly understood that the invention is not limited to the particular forms or uses of bellows containers illustrated on the drawing, as it may be applied to bellows of any suitable construction and applied to any suitable use. Also it is to be expressly understood that the end closure members may be of a wide variety of constructions other than those illustrated on the drawing, and in fact may be of any suitable construction and secured to the bellows in any suitable way, and as preferred either the end wall or a suitable surface on the post may provide the stop for cooperation with the inwardly projecting flange in limiting the contractive movements of the bellows. Reference is therefore to be had to the appended claims for a definition of the limits of the invention.

What is claimed is:—

1. In a device for limiting the movement of a bellows, a bellows member, a centrally apertured end wall sealed to one end of said bellows member, a post projecting through said apertured end wall, a flange on said post, said flange engaging the outside of said apertured end wall, a sleeve engaging the interior projecting portion of said post and engaging the interior of said apertured end wall to clamp said apertured end wall against said flange, a second flange mounted on said sleeve adjacent its inner end, a second end wall closing the opposite end of said bellows member, an inwardly projecting centrally apertured cup-shaped member clamped between said second named end wall and said bellows member, said sleeve and said post passing through said apertured cup, said flange on said sleeve engaging the interior of said cup to limit the expansion of said bellows member, said first named end wall engaging the exterior of said cup to limit the contraction of said bellows member.

2. In a device for limiting the movement of a bellows, a bellows member, a centrally apertured end wall sealed to one end of said bellows member, a post projecting through said apertured end wall, a flange on said post said flange engaging the outside of said end wall, a sleeve engaging the interiorly projecting portion of said post and engaging the interior side of said end wall to clamp said end wall against said flange, a second flange mounted on said sleeve adjacent its inner end, a second end wall closing the opposite end of said bellows member, an inwardly projecting centrally apertured cup-shaped member clamped between said second named end wall and said bellows member, said sleeve and said post passing through said apertured cup, said flange on said sleeve engaging the interior of said cup to limit the expansion of said bellows member, said first named end wall engaging the exterior of said cup to limit the contraction of said bellows member and projecting means associated with said cup and said second named flange to allow free communication beween the interior of said cup and the interior of said bellows member at any position of said bellows member.

PAUL E. CATE.